US009129452B2

(12) United States Patent

Friedli et al.

(10) Patent No.: US 9,129,452 B2

(45) Date of Patent: Sep. 8, 2015

(54) EMERGENCY OPERATION OF ELEVATORS

(75) Inventors: Paul Friedli, Remetschwil (CH); Josef Schwarzentruber, Udligenswil (CH)

(73) Assignee: Inventio AG, Hergiswil NW (CH)

( * ) Notice: Subject to any disclaimer, the term of this patent is extended or adjusted under 35 U.S.C. 154(b) by 248 days.

(21) Appl. No.: 13/382,767

(22) PCT Filed: Jun. 25, 2010

(86) PCT No.: PCT/EP2010/059041

§ 371 (c)(1),
(2), (4) Date: May 29, 2012

(87) PCT Pub. No.: WO2011/003749

PCT Pub. Date: Jan. 13, 2011

(65) Prior Publication Data

US 2012/0223808 A1 Sep. 6, 2012

(30) Foreign Application Priority Data

Jul. 6, 2009 (EP) .................................... 09164689

(51) Int. Cl.

| | |
|---|---|
| ***G05B 19/00*** | (2006.01) |
| ***B60R 25/00*** | (2013.01) |
| ***G05B 23/00*** | (2006.01) |
| ***G01S 13/74*** | (2006.01) |
| ***G06F 21/00*** | (2013.01) |
| ***G06F 7/04*** | (2006.01) |
| ***G06F 17/30*** | (2006.01) |
| ***G07C 9/00*** | (2006.01) |
| *E05B 47/06* | (2006.01) |
| *E05B 47/00* | (2006.01) |

(52) U.S. Cl.

CPC ........ *G07C 9/00103* (2013.01); *G07C 9/00904* (2013.01); *E05B 47/0676* (2013.01); *E05B 2047/0094* (2013.01)

(58) Field of Classification Search

CPC .......................................................... H04L 9/32
USPC .......................................... 713/186; 340/5.52
See application file for complete search history.

(56) References Cited

U.S. PATENT DOCUMENTS

| | | | | |
|---|---|---|---|---|
| 6,064,316 | A * | 5/2000 | Glick et al. | 340/5.65 |
| 6,865,549 | B1 * | 3/2005 | Connor | 705/51 |

(Continued)

FOREIGN PATENT DOCUMENTS

| | | | |
|---|---|---|---|
| DE | 43 07 360 | A1 | 6/1994 |
| WO | WO 2006/056085 | A | 6/2006 |

OTHER PUBLICATIONS

International Search Report dated Sep. 8, 2010 issued in parent International patent application No. PCT/EP2010/059041.

*Primary Examiner* — Jennifer Mehmood
*Assistant Examiner* — Pameshanand Mahase
(74) *Attorney, Agent, or Firm* — Stroock & Stroock & Lavan LLP

(57) ABSTRACT

An access control system includes at least one door fitting to a secured area of a building and at least one identification code on a mobile data carrier. The identification code is read by a read device of a door fitting. If the read-in identification code is valid, access is granted to the area secured by the door fitting. An authorization code is transmitted from a processor via at least one communication connection to a central processor. A verification step is carried out to determine whether the transmitted authorization code corresponds to a valid authorization code for an area profile. Upon successful verification of the transmitted authorization code, write and read rights for the area profile are released to the processor transmitting the authorization code. The released area profile is changed by the processor via a communication connection.

20 Claims, 8 Drawing Sheets

(56) References Cited

U.S. PATENT DOCUMENTS

| | | | | |
|---|---|---|---|---|
| 6,972,660 | B1 * | 12/2005 | Montgomery et al. | 340/5.52 |
| 2002/0099945 | A1 * | 7/2002 | McLintock et al. | 713/186 |
| 2004/0003257 | A1 | 1/2004 | Mitchell | |
| 2004/0210796 | A1 * | 10/2004 | Largman et al. | 714/20 |
| 2004/0243812 | A1 | 12/2004 | Yui et al. | |
| 2005/0044378 | A1 * | 2/2005 | Beard et al. | 713/182 |
| 2006/0136741 | A1 * | 6/2006 | Mercredi | 713/185 |
| 2007/0176739 | A1 | 8/2007 | Raheman | |

* cited by examiner

EMERGENCY OPERATION OF ELEVATORS

FIELD

The disclosure relates to operating an access control system.

BACKGROUND

W02008/089207A1 discloses a method for operating an access control system for controlling access to a secured area of a building such as a story or a section of a story. The access control system comprises a central computer unit and a door opener. The door opener grants access to the secured area. The central computer unit is communicatively connected to the door opener via network-supported access points. The door opener has a reader, which reads in an identification code from a mobile data carrier. The read-in identification code is checked either by the reader or by the central computer unit with an identification code in a list comprising valid identification codes for the secured area. Upon successful checking, the door opener grants access to the secured area.

SUMMARY

In at least some embodiments, the access control system has at least one door fitting to a secured area of a building and at least one identification code on a mobile data carrier; which identification code is read in by a reader of a door fitting; wherein if a read-in identification code is valid, access to the area secured by the door fitting is granted; a computer unit communicates an authorization code to a central computer unit via at least one communicative connection; a check is made to determine whether the authorization code corresponds to a valid authorization code for an area profile; upon successful checking of the communicated authorization code, write and read rights for the area profile are released to the computer unit communicating the authorization code; the released area profile is changed by the computer unit via a communicative connection.

This can mean that, from a given computer unit, it is possible to change an area profile with a valid identification code to a secured area of the building, which makes the operation of the access control system simple and flexible. The computer unit has to identify itself as authorized for this changing of the area profile with an authorization code at a central computer unit. The validity of this authorization code is checked. The communication of the authorization code and the changing of the released area profile are effected via a communicative connection. In this way, the operation of the access control system can be secure.

In some embodiments, the computer unit includes an identification code of a mobile data carrier as valid identification code in the released area profile. In some embodiments, the computer unit removes an identification code of a mobile data carrier as valid identification code from the released area profile.

This can mean that, from the computer unit, a valid identification code of a mobile data carrier can be included in and/or removed from the area profile. Neither the computer unit nor the mobile data carrier necessarily has to be physically at the location of the door fitting and/or the central computer unit, which can make the operation of the access control system simple and flexible.

In some embodiments, the computer unit changes a validity of an identification code of the released area profile. In some embodiments, the computer unit includes an entity in the released area profile. Possibly, the computer unit removes an entity from the released area profile. Possibly, the computer unit changes a read right of an entity of the released area profile. Possibly, the computer unit changes a write right of an entity of the released area profile. Possibly, the computer unit changes a time zone of an entity of the released area profile.

This can mean that diverse specifications of the released area profile can be maintained from the computer unit, which can make the operation of the access control system simple and flexible.

In some embodiments, the computer unit creates an identification code of a mobile data carrier in a released area profile as provisional identification code; and if the reader of the door fitting that grants access to the secured area of the released area profile reads in an identification code corresponding to the provisional identification code, the read-in identification code is included in the released area profile as valid identification code.

This can mean that a provisional identification code of a mobile data carrier is created by the computer unit first in the released area profile and it is only when the provisional identification code is actually read in that the read-in identification code is included in the released area profile as a valid identification code. Consequently, a new identification codes is included in the area profile only when it is actually read in by the reader, which makes the operation of the access control system more secure. Moreover, the inclusion of an identification code in an area profile thus does not necessitate a reader at the computer unit, which makes the operation of the access control system simple and cost-effective.

In some embodiments, a provisional identification code is created by the specification of a digit sequence in a released area profile; and if the reader of the door fitting that grants access to the secured area of the released area profile reads in a digit sequence corresponding to the digit sequence of the provisional identification code, an identification code read in with the digit sequence is included in the released area profile as valid identification code.

This can mean that the computer device does not have to include a complete identification code in the released area profile, rather that it suffices to include parts of the identification code, for example the first two or three digits of the identification code, in the released area profile. Moreover, it can suffice to include specifications of the area profile, for example a name or a first name, in the released area profile and, when these specifications are read in, to include the identification code read in with these specifications in the area profile as valid identification code. This makes the operation of the access control system simple and flexible.

In some embodiments, a provisional identification code is created by the specification of a time duration in a released area profile; and if, within the time duration, the reader of the door fitting that grants access to the secured area of the released area profile reads in an identification code corresponding to the provisional identification code, the read-in identification code is included in the released area profile as valid identification code.

This can mean that the computer device does not have to include any identification code at all in the released area profile, rather that, for example, the temporally next identification code read-in is included in the area profile as a valid identification code, which makes the operation of the access control system simple and flexible.

In some embodiments, the central computer unit communicates at least one part of an area profile for the area secured by a door fitting via a communicative connection to the door fitting; a processor of a door fitting checks whether an identification code read in by the reader of the door fitting corresponds to a valid identification code of the communicated area profile for the area secured by the door fitting. In some embodiments, the area profile is stored at least partly in a computer-readable data memory of the central computer unit. In some embodiments, the area profile is stored at least partly in a computer-readable data memory of the door fitting. In some embodiments, the central computer unit communicates at least one part of an area profile for the area secured by a door fitting via a communicative connection to the door fitting; a processor of the door fitting checks whether an identification code read in by the reader of the door fitting corresponds to a valid identification code of the communicated area profile for the area secured by the door fitting; upon successful checking of the read-in identification code, the processor communicates an access signal to an actuator of the door fitting; and access to the area secured by the door fitting is granted by the actuator for the communicated access signal.

This can mean that a processor of a door fitting checks on site whether an identification code read in by the reader of the door fitting corresponds to a valid identification code of the area profile for the area secured by the door fitting, which can make the operation of the access control system rapid since time-consuming enquiries from the door fitting at the central computer unit remote from the door fitting are not necessary for the purposes of checking. The communication of the area profile for the area secured by the door fitting to the reader can take place at regular and/or irregular time intervals, for example when it is necessary to update the area profile stored in the computer-readable data memory of the door fitting. Moreover, it is not necessary for the entire area profile to be communicated, rather it suffices to communicate a part of the area profile, which reduces the transmission time. By way of example, only a changed part of the area profile is communicated.

In some embodiments, an identification code read in by a reader is communicated to the central computer unit via a communicative connection. In some embodiments, the central computer unit checks whether an identification code read in by a reader of a door fitting corresponds to a valid identification code of an area profile for the area secured by the door fitting of the reader. In some embodiments, upon successful checking of the read-in identification code, the central computer unit communicates an access signal via the communicative connection to an actuator of the door fitting; and access to the area secured by the door fitting is granted by the actuator for the communicated access signal.

This can mean that the remote central computer unit checks whether an identification code read in by the reader corresponds to a valid identification code of the area profile for the area secured by the door fitting of the reader, which makes the operation of the access control system secure.

In some embodiments, the central computer unit communicates a communicated authorization code via a communicative connection to a building computer unit; the building computer unit checks whether the communicated authorization code corresponds to a valid authorization code for an area profile; and, upon successful checking of the communicated authorization code, the building computer unit communicates an authorization signal via a communicative connection to the central computer unit. In some embodiments, the central computer unit, for a communicated authorization signal, releases write and read rights for the area profile to the computer unit communicating the authorization code.

This can mean that a building computer unit as further entity carries out the checking of the communicated authorization code. The communication of the communicated authorization code from the central computer unit to the building computer unit and the communication of the authorization signal back to the central computer unit are effected via a communicative connection, which makes the operation of the access control system secure.

In some embodiments, upon successful checking of the communicated authorization code, the central computer unit releases write and read rights for the area profile to the computer unit communicating the authorization code.

This can mean that the remote central computer unit, upon successful checking of the communicated authorization code, releases write and read rights for the area profile to the computer unit communicating the authorization code, which makes the operation of the access control system secure.

In some embodiments, the access control system for carrying out the method comprises the computer unit. In some embodiments, the access control system comprises the central computer unit. In some embodiments, the access control system comprises a building computer unit. In some embodiments, the access control system comprises a network-supported communicative connection between the computer unit and the central computer unit. In some embodiments, the access control system comprises a network-supported communicative connection between the central computer unit and the door fitting. In some embodiments, the access control system comprises a reading-in of the identification code of the mobile data carrier via a data communication by the reader. In some embodiments, the access control system comprises a network-supported communicative connection between the central computer unit and a building computer unit.

This can mean that a simple and secure communicative connection between the computer unit and the central computer unit, a simple and secure communicative connection between the central computer unit and the door fitting, a simple and secure data communication from the mobile data carrier to the door fitting, and a simple and secure communicative connection between the central computer unit and the building computer unit are effected.

In some embodiments, the door fitting is arranged on a door leaf of a door to the area secured by the door fitting. In some embodiments, the reader is arranged in a door mounting of the door fitting. In some embodiments, a processor is arranged in a door mounting of the door fitting. In some embodiments, a computer-readable data memory is arranged in a door mounting of the door fitting. In some embodiments, a transmitting and receiving unit for a network-supported communicative connection between the central computer unit and the door fitting is arranged in a door mounting of the door fitting. In some embodiments, an electrical power supply is arranged in a door mounting of the door fitting.

This can mean that the door fitting and its components can be arranged compactly and in a vandal-proof manner.

In some embodiments, the computer unit is arranged in the area secured by the door fitting.

This can mean that, from a secured area of the building, an identification code of a mobile data carrier can be included in and/or removed from the area profile for a secured area of the building, which can make the operation of the access control system simple, flexible and secure.

In some embodiments, a computer program product comprises at least one computer program means suitable for realizing the method for operating an access control system by virtue of at least one method step being performed if the computer program means is loaded into at least one processor of the door fitting and/or into at least one processor of the computer unit and/or into at least one processor of the central computer unit and/or into at least one processor of the building computer unit. In some embodiments, a computer-readable data memory comprises such a computer program product.

BRIEF DESCRIPTION OF THE DRAWINGS

Exemplary embodiments of the disclosed technologies will be explained in detail with reference to the figures.

DETAILED DESCRIPTION

Figure 1:
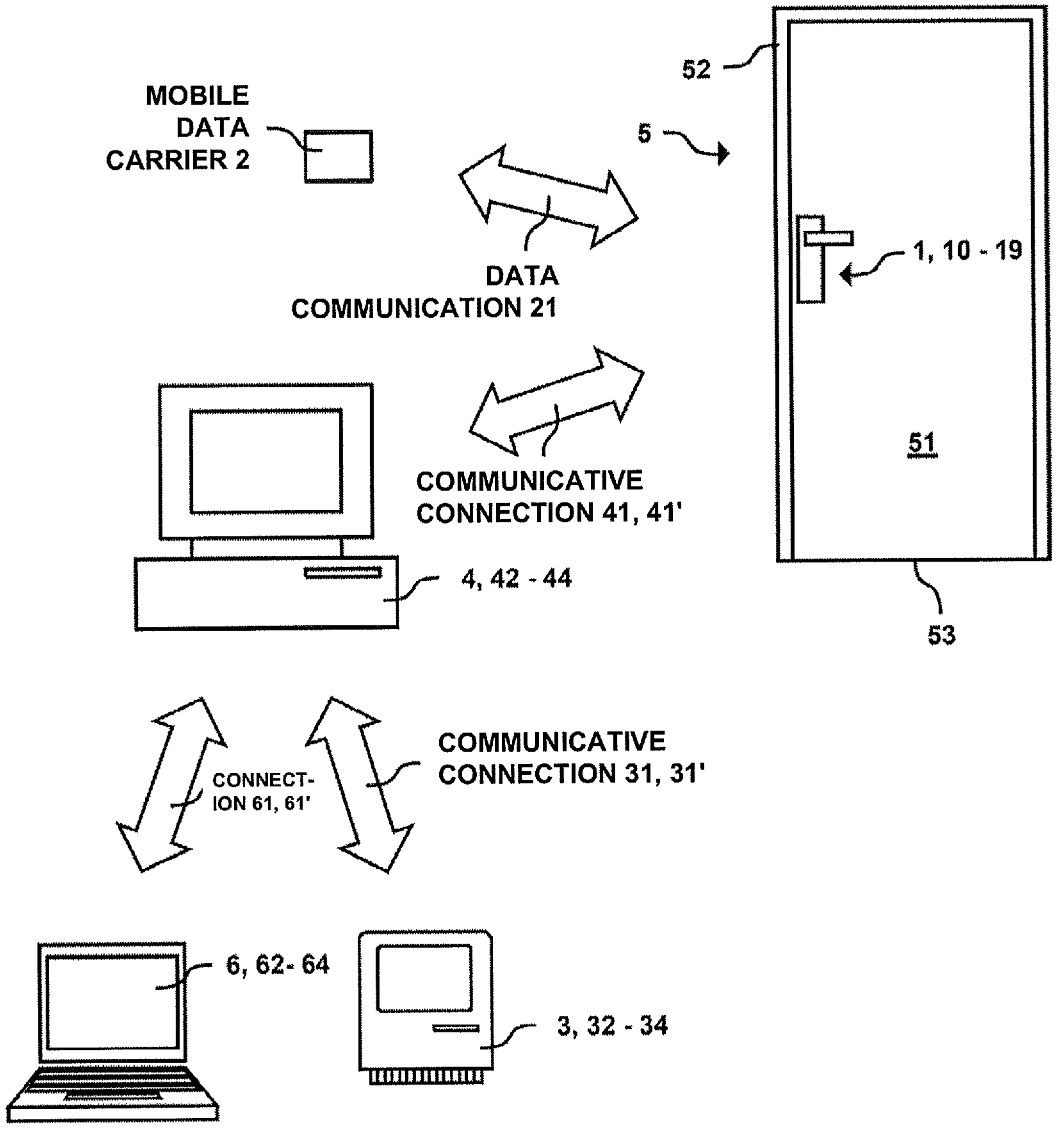
FIG. 1 shows a schematic illustration of the method for operating an access control system.

FIG. 1 shows a schematic illustration of the method for operating an access control system in a building. For this disclosure, the term building should be interpreted broadly. A building has at least one secured area. The door 5 allows access to this secured area of the building. The secured area can be a room, a corridor, a stairwell, an elevator, a wing, a hall, a garage, a light well, a garden, a dwelling, an office, a practice, a hotel room, a laboratory, a cell etc. of the building.

The door 5 has, in accordance with FIG. 1, at least one door leaf 51, at least one door fitting 1, at least one door frame 52 and at least one door threshold 53. The door frame 52 is anchored fixedly and stably in the walls of the building. The door 5 can be opened and closed. Access to the secured area of the building takes place by crossing the door threshold 52 when the door 5 has been opened. When the door 5 is closed, there is no access to the secured area of the building.

Figure 2:
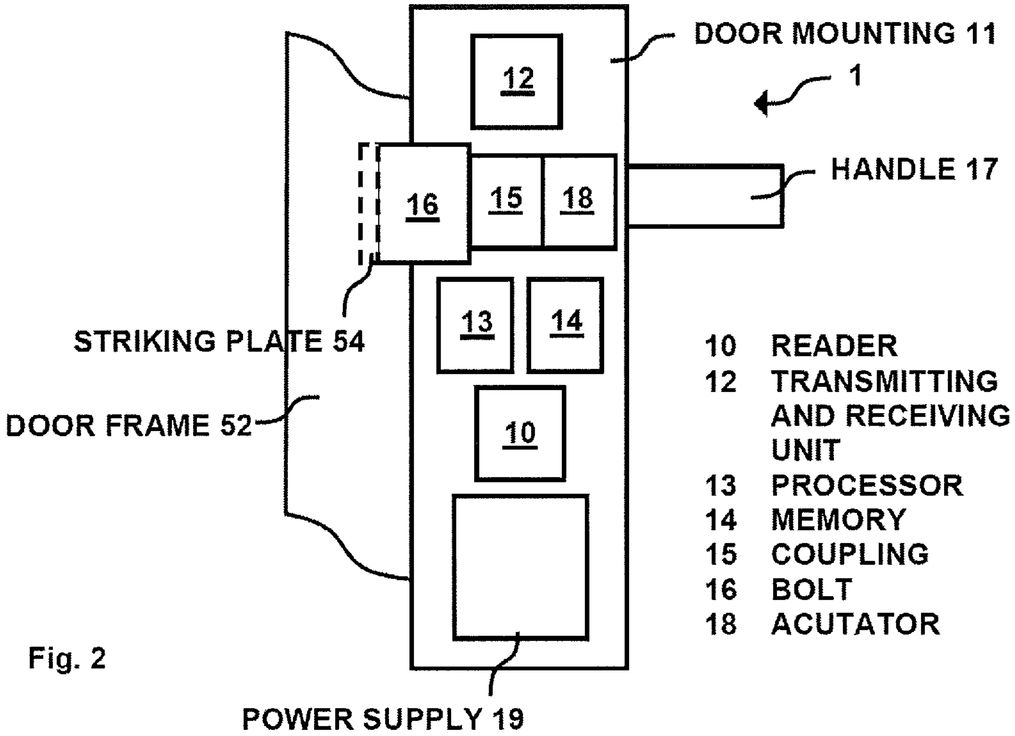
FIG. 2 shows a schematic view of a part of a door fitting of an access control system in accordance with FIG. 1.

In accordance with FIG. 2, the door fitting 1 has at least one door mounting 11 comprising at least one bolt 16 and at least one handle 17. The door mounting 11 has an inner fitting and an outer fitting. Between the inner fitting and the outer fitting, the door mounting forms a cavity. The inner fitting is arranged on the side of the door 5 toward the interior of the building or toward the interior of the secured area of the building. A handle 17 can be arranged both on the inner fitting and at the outer fitting. The outer fitting is arranged on the side of the door 5 toward the exterior of the building or toward the exterior of the secured area of the building. For protection against sabotage, the door mounting 11, at least in regions, is produced in a durable manner and from hardened high-grade steel, spring steel, etc. When the door 5 is closed, the bolt 16 is latched into at least one striking plate 54 of the door frame 52. When the door 5 is open, the bolt 16 is not latched in the striking plate 54 of the door frame 52. The bolt 16 can be actuated by pressing the handle 17. Bolt 16 and handle 17 are coupled to one another in a force-locking manner via a coupling 15. The coupling 15 can be activated and deactivated by the movement of at least one coupling lever. When the coupling 15 is activated, an actuation of the handle 17 is transmitted to the bolt 16. When the coupling 15 is deactivated, no actuation of the handle 17 is transmitted to the bolt 16. In this case, handle 17 and bolt 16 are decoupled and the closed door 5 cannot be opened by actuating the handle 17. At least one actuator 18 can move the coupling lever and activate or deactivate the coupling 15. The actuator 18 is an electric motor, for example, which is supplied with electrical power by at least one electrical power supply 19 and moves the coupling lever. The actuator 18 is driven by at least one access signal. In the absence of an access signal, the coupling 15 is deactivated, and when an access signal is present, the coupling 15 is activated. The activation of the coupling 15 can be limited temporally to a few seconds, for example five seconds, etc., in such a way that the actuator 18 automatically deactivates the coupling 15 after this time duration has elapsed. However, such a short time duration is not mandatory. With knowledge of the present disclosure, the person skilled in the art can cause the coupling 15 to be activated also for any longer time durations that may be desired. The electrical power supply 19 is likewise arranged in the cavity of the door mounting 15 and consists of a battery or a rechargeable battery or a fuel cell or a solar cell having energetic autonomy of one year, possibly two years. At least one luminaire such as a light emitting diode (LED), an organic light emitting diode (OLED), etc. can also be arranged on the door fitting 1. By way of example, a varicolored LED which can emit light in different colors such as green, red, yellow, blue, etc. is arranged. By way of example, a plurality of LEDs which can emit light in different colors such as green, red, yellow, blue, etc. are arranged. At least one loudspeaker which can output at least one tone can also be arranged on the door fitting 1. The light emission of the luminaire and/or the tone of the loudspeaker are/is perceptible by a person in the area of the door and can reproduce at least one item of status information. By way of example, when an access signal is present, the luminaire is activated to effect green flashing; by way of example, when a disturbance signal is present, the luminaire is activated to effect red flashing. By way of example, when an access signal is present, the loudspeaker is activated to effect a 500 Hz tone; by way of example, when a disturbance signal is present, the loudspeaker is activated to effect a 1000 Hz tone.

At least one reader 10 is arranged in the door mounting 11 and is supplied with electrical power by the electrical power supply 17. The reader 10 has at least one antenna for radio frequencies, a magnetic swipe reader, an electronic swipe reader, a biometric sensor, etc. for a data communication 21 from at least one mobile data carrier 2. Exemplary embodiments of the mobile data carrier 2 are explained below:

- The data communication 21 is based, for example, on a contactless data communication 21 such as radio frequency identification device (RFID according to IS011785). The radio frequencies are, for example, in bands at 125 kHz, 13.6 MHz, etc. The mobile data carrier 2 is an RFID having at least one electrical coil and at least one computer-readable data memory in which at least one identification code is stored. The RFID does not have its own electrical power supply. The RFID has the form of a credit card, for example, or is integrated in a key fob. The antenna of the reader 10 emits radio frequencies. The range of the antenna is a few centimeters. As soon as the RFID comes within the range of the radio frequency connection 21, the RFID is energetically activated by the radio frequencies by means of the electrical coil and the identification code of the RFID that is stored in the computer-readable data memory is transmitted to the antenna of the reader 10 by means of the electrical coil of the RFID.

The data transmission 21 is based, for example, on a contactless data communication 21 such as Bluetooth (IEEE802.15.1), ZigBee (IEEE802.15.4), WiFi (IEEE802.11), etc. The radio frequencies are, for example, in bands at 800 to 900 MHz, 1800 to 1900 MHz, 1.7 to 2.7 GHz, etc. The range of the antenna varies from a few meters in the case of Bluetooth and ZigBee, up to a few hundred meters in the case of WiFi. The mobile data carrier 2 is a mobile device such as a cellular telephone, personal digital assistant (PDA), etc., comprising at least one antenna, at least one processor, at least one computer-readable data memory and a dedicated electrical power supply. The antenna of the reader 10 emits radio frequencies with enquiry signals. As soon as the mobile device comes within the range of the radio frequency connection 21 and receives an enquiry signal from the reader 10, the antenna of the mobile device transmits a response signal to the antenna of the reader 10. The identification code stored in the computer-readable data memory of the mobile device is transmitted to the antenna of the reader 10 via the antenna of the mobile device.

However, the data communication 21 can also be based on reading a magnetic stripe and/or an electronic data memory in a contact-based fashion. In this case, the mobile data carrier 2 is a card having a magnetic stripe and/or an electronic data memory. The magnetic stripe and/or the electronic data memory are/is read by a magnetic swipe reader or an electronic swipe reader of the reader 10.

The data communication 21 can also be based on reading a biometric signal by means of a biometric sensor. In this case, the mobile data carrier 2 is a person's fingertip, a person's hand, a person's face, a person's iris, a person's body, a person's odor, etc., which is read by a biometric sensor of the reader 10 as a fingerprint, hand geometry, face profile, iris profile, retinal scan, thermogram, odor, weight, voice, signature, etc.

At least one transmitting and receiving unit 12, at least one processor 13 and at least one computer-readable data memory 14 are arranged in the door mounting 11 and are supplied with electrical power by the electrical power supply 17. The transmitting and receiving unit 12 realizes at least one network-supported communicative connection 41 between the door fitting 1 and at least one central computer unit 4. The transmitting and receiving unit 12, the processor 13 and the computer-readable data memory 14 are arranged on at least one circuit board and are connected to one another via at least one signal line. From the computer-readable data memory 14, at least one computer program means is loaded into the processor 13 and executed. The computer program means controls the communication between the transmitting and receiving unit 12, the processor 13 and the computer-readable data memory 14. The computer program means also controls the communicative connection 41.

At least one central computer unit 4 has at least one transmitting and receiving unit 42, at least one processor 43 and at least one computer-readable data memory 44. The transmitting and receiving unit 42 realizes at least one network-supported communicative connection 41 between the central computer unit 4 and at least one door fitting 1 and/or at least one network-supported communicative connection 31, 31' between the central computer unit 4 and at least one computer unit 3. From the computer-readable data memory 44, at least one computer program means is loaded into the processor 43 and executed. The computer program means controls the communication between the transmitting and receiving unit 42, the processor 43 and the computer-readable data memory 44. The computer program means also controls the communicative connection 31, 31', 41, 41'. The central computer unit 4 can be a microcomputer such as a workstation, personal computer (PC), etc. The central computer unit 4 can consist of a hierarchical assemblage of a plurality of microcomputers. The central computer unit 4 can be arranged in the building and/or in a manner remote from the building. In one embodiment, the processor 43 and a first computer-readable data memory 44 can be arranged in a control center for the maintenance of the access control system, while a further computer-readable data memory 44 is arranged in the building of the access control system.

At least one computer unit 3 has at least one transmitting and receiving unit 32, at least one processor 33 and at least one computer-readable data memory 34. The transmitting and receiving unit 32 realizes at least one network-supported communicative connection 41, 41' between the computer unit 3 and at least one central computer unit 4. From the computer-readable data memory 34, at least one computer program means is loaded into the processor 33 and executed. The computer program means controls the communication between the transmitting and receiving unit 32, the processor 33 and the computer-readable data memory 34. The computer unit 3 can be a mobile microcomputer such as a PC, notebook, netbook, cellular telephone, PDA, etc. The computer program means also controls the communicative connection 41. Consequently, from the computer unit 3, a network-supported communicative connection 41, 41' between the computer unit 3 and the central computer unit 4 can be established, maintained and ended again via a computer program means. The computer program means can be a computer program for viewing computer-supported pages of the World Wide Web. Such web browsers are known by the names Internet Explorer, Firefox, Opera, etc. The computer unit 3 can be arranged in the building and/or in a manner remote from the building.

At least one building computer unit 6 has at least one transmitting and receiving unit 62, at least one processor 63 and at least one computer-readable data memory 64. The transmitting and receiving unit 62 realizes at least one network-supported communicative connection 61, 61' between the building computer unit 6 and the central computer unit 4. From the computer-readable data memory 64, at least one computer program means is loaded into the processor 63 and executed. The computer program means controls the communication between the transmitting and receiving unit 62, the processor 63 and the computer-readable data memory 64. The computer program means also controls the communicative connection 61, 61'. The building computer unit 6 can be a microcomputer such as a workstation, personal computer (PC), etc. The building computer unit 6 can consist of a hierarchical assemblage of a plurality of microcomputers. The building computer unit 6 can be arranged in the building and/or in a manner remote from the building.

Exemplary embodiments of the communicative connection 31, 31', 41, 41', 61, 61' are explained below:

The communicative connection 31, 31', 41, 41', 61, 61' can be a network such as Ethernet, ARCNET, etc., comprising at least one electrical and/or optical signal line. The network allows bidirectional communication in accordance with known and proven network protocols such as the Transmission Control Protocol/Internet Protocol (TCP/IP), Hypertext Transfer Protocol (HTML), Simple Mail Transfer Protocol (SMTP), Internet Message Access Protocol (IMAP), Internet Packet Exchange (IPX), etc. The subscribers in the network are uniquely addressable by means of network addresses. In order to increase the security during the communicative connection 31, 31', 41, 41', 61, 61', the communication of security-relevant data is effected in encrypted form by means of an encrypted communicative connection 31', 41', 61'. Known encryption protocols are the Secure Sockets Layer (SSL), Secure Multipurpose Internet Mail Extensions (S/MIME), etc. The encryption protocol is positioned, in the Open Systems Interconnection (OSI) reference model, above the TCP transport layer and below application programs such as HTML or SMTP). An unencrypted communicative connection is designated by 31, 41, 61.

The communicative connection 31, 41, 61 can be a telephone radio network such as Global Systems for Mobile Communications (GSM), General Radio Packet Services (GPRS), Enhanced Data Rate for GSM Evolution (EDGE), Universal Mobile Telecommunications System (UMTS), High Speed Download Packet Access (HSDPA), etc. The frequencies used by the telephone radio network are in bands at 800 to 900 MHz and 1800 to 1900 MHz in the case of GSM and GPRS, and at 700 to 900 MHz and 1.7 to 2.7 GHz in the case of UMTS and HSDPA.

The communicative connection 31, 41, 61 can be a telephone landline network such as Public Switched Telecommunication Network (PSTN). The telephone landline network can be configured in analog and/or digital fashion. In the case of an analog telephone landline network, analog tone signals are communicated. In this case, the bandwidth is limited to the frequency range of 300 to 3400 Hz. Besides a voice signal, further signals such as a dialing signal, a call signal, etc. are communicated. A digital telephone landline network is known as Integrated Services Digital Network (ISDN), Asymmetric Digital Subscriber Line (ADSL), Very High Data Rate Digital Subscriber Line (VDSL), etc. In the case of ADSL, a significantly wider frequency range of 200 Hz to 1.1 MHz is used.

Given knowledge of the present disclosure, the person skilled in the art can also realize the communicative connection 31, 41, 61 via a telephone radio network and/or a telephone landline network in encrypted form.

The access control system operates the access to a secured area of the building by means of at least one area profile. The area profile is, for example, a computer-readable file and can be stored at least partly in a computer-readable data memory 14 of the door fitting 1 and/or in a computer-readable data memory 44 of the central computer unit 4. An area profile relates to a secured area of the building and comprises at least one entity and, for said entity, the area profile comprises different specifications such as name, first name, identification code, read right, write right, history, time zone, validity, etc.

Entity denotes at least one person and/or substantive object, which entity has access to this secured area of the building for this identification code. The person can be a human or an animal. The substantive object can be a vehicle, a pallet, a container, a robot, etc.

Name and first name denote the name and first name of the entity. In the case of a person, the name and first name of the person are specified such as are specified in official documents such as a personal identity card, travel document, etc. of this person.

The identification code consists, for example, of at least one digit sequence, which can be encrypted or unencrypted, which has to be used by the entity for identification purposes in order to obtain access to this secured area of the building. The digit sequence can be numerical, alphanumeric, etc. The identification code can also be at least one independent file, which can be encrypted or unencrypted. The identification code can also be at least one biometric signal of the entity, which can be encrypted or unencrypted as an independent file.

Read right is understood to mean an authorization of the entity to read the content of the area profile. Write right is understood to mean an authorization of the entity to read and to change the content of the area profile.

History denotes stored accesses and/or exits by the entity to and/or from this secured area of the building. By way of example, the history comprises the date and the time of day of each access to this secured area of the building and also the date and the time of day of each exit from this secured area of the building.

Time zone denotes a temporal limitation of the access by the entity to this secured area of the building. The time zone can comprise just specific hours in a week, for example for an entity who is supposed to clean this secured area of the building on weekdays between 8.00 pm and 9.00 pm. However, the time zone can also be unlimited, for example for a person who permanently lives in this secured area of the building. A time zone can be repeated as often as desired, but it can also occur just once. By way of example, a person stays for a single night in a hotel room as secured area of the building. For this person, the time zone then begins at noon of the first day and lasts the whole night through to 11.00 am of the following day.

Validity specifies whether the identification code with respect to this secured area of the building is valid at the current point in time. If an identification code was valid at an earlier point in time and is invalid at the present point in time, this earlier validity can be provided with a date and a time of day of this change.

During the operation of the access control system, the specifications of the area profile are maintained. Exemplary embodiments in this respect are explained below:

The secured area of the building consists, for example, of a number of offices of a company in which a number of persons work on weekdays. A plurality of area profiles exist for the offices of this company, with one area profile for each office. If one of these persons then changes his/her work and no longer works in the old office, but rather in a new office of the company, the area profiles for this old office and for this new office have to be changed. In the area profile for the old office, either the specifications concerning the entity, the name, the first name of said person are removed or the specification of validity for this person is set to invalid in the area profile for the old office or the specification of time zone is set to zero in the area profile for the old office, that is to say that access is not granted at any time. In the area profile for the new office, the specifications concerning the entity, the name, the first name, the identification code and the time zone are included for this person. The person has neither a read right nor a write right to the area profile for the new office.

The secured area of the building consists, for example, of a dwelling in which a family comprising two or more persons permanently resides. The area profile for this dwelling only comprises specifications concerning the persons of the family. If the family takes a vacation and leaves the dwelling for two weeks, and the neighbor is supposed to water the flowers in the dwelling during these two weeks, then the area profile for this dwelling has to be changed. A new entity for the neighbor is included in the area profile for this dwelling, with specifications concerning the name, the first name, the identification code and the time zone. The neighbor has neither a read right nor a write right. The time zone is two weeks, for as long as the vacation period.

For maintaining an area profile, at least one authorization code is communicated to the central computer unit 4 from the computer unit 3. In a similar manner to the identification code, the authorization code consists of at least one digit sequence, which can be encrypted or unencrypted. The digit sequence can be numerical, alphanumeric, etc. The authorization code can also be at least one independent file, which is encrypted or unencrypted. The authorization code can also be at least one biometric signal of the entity, which can be encrypted or unencrypted as an independent file. The authorization code can be identical to the identification code. The authorization code can be an address, for example a mail address (email address) for a communication in accordance with SMTP, IMAP, etc.

A check is made to determine whether the communicated authorization code corresponds to a valid authorization code for an area profile. Each area profile is linked to a valid authorization code. The valid authorization codes can be stored in the central computer unit 4 or in the building computer unit 6. The check can be made by the central computer unit 4 and/or the building computer unit 6. In one configuration of the method, the communicated authorization code is communicated from the central computer unit 4 via a communicative connection 61, 61' to the building computer unit 6, which building computer unit 6 checks the communicated authorization code and, upon successful checking, communicates an authorization signal via a communicative connection 61, 61' to the central computer unit 4.

Upon successful checking of the communicated authorization code, the central computer unit 4 releases write and read rights for the area profile linked to the communicated authorization code to the computer unit 3 communicating the authorization code. If the communicated authorization code is checked by the building computer unit 6, the central computer unit 4 releases write and read rights for an area profile only after the communication of a corresponding authorization signal. For a released area profile, the central computer unit 4 communicates a release signal to the computer unit 3 via the communicative connection 31, 31'. From the computer unit 3, the released area profile is changed via the communicative connection 31, 31'. For this purpose, the computer unit 3 communicates at least one change signal via the communicative connection 31, 31' to the central computer unit 4, which central computer unit 4 implements a change in the area profile for a received change signal. The change in the area profile can comprise erasure, addition, or alteration of a specification of the area profile, such as name, first name, identification code, read right, write right, history, time zone, validity, etc.

Figure 3:
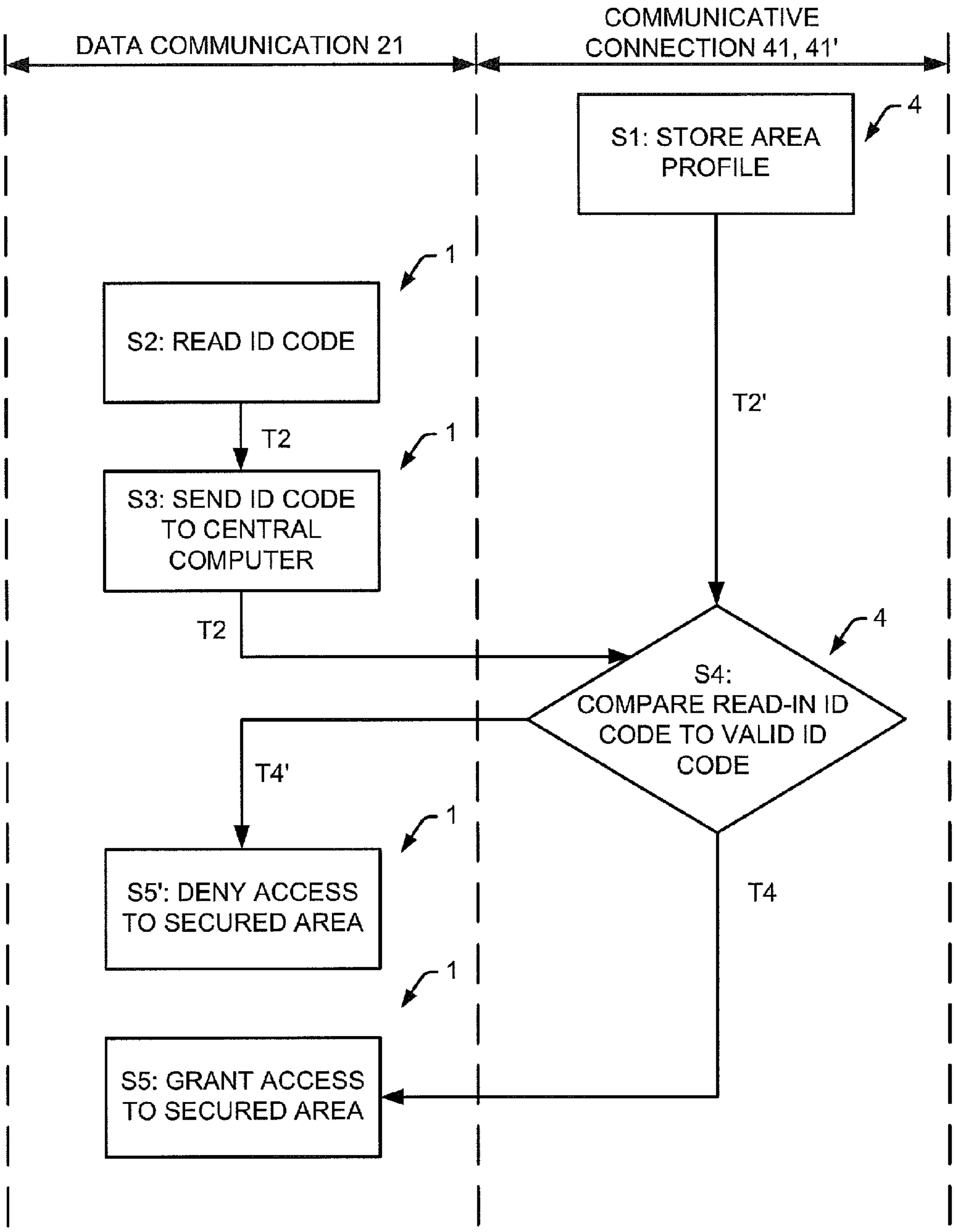
FIG. 3 shows a flowchart with steps of a first exemplary embodiment of the method in accordance with FIG. 1.

FIGS. 3 to 8 show flowcharts of steps of exemplary embodiments of the method for operating an access control system. The individual steps are described below:

In a step S1, in accordance with FIG. 3, an area profile T1 with a valid identification code T2' is stored in the central computer unit 4 and is present there.

Figure 4:
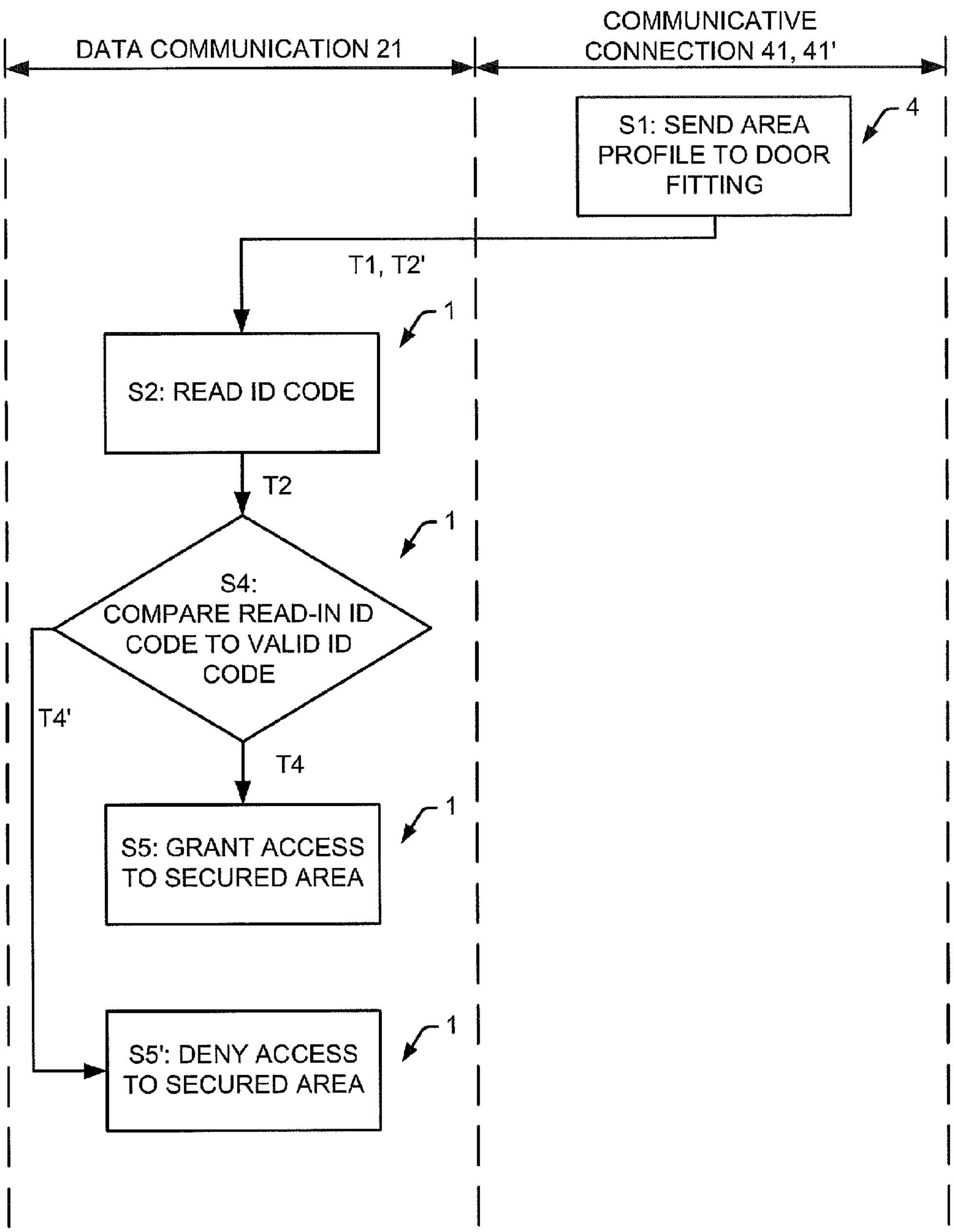
FIG. 4 shows a flowchart with steps of a second exemplary embodiment of the method in accordance with FIG. 1.
Figure 5:
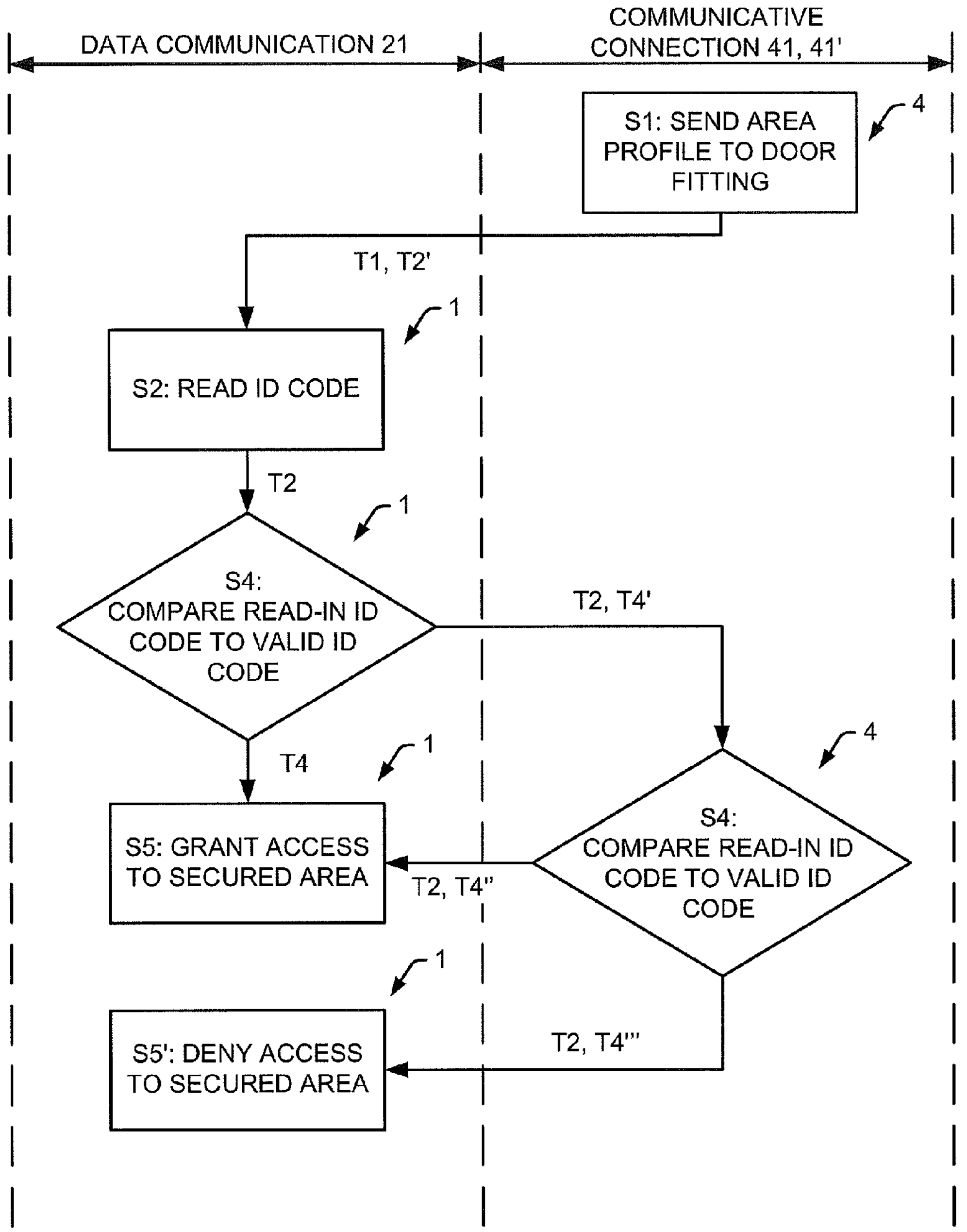
FIG. 5 shows a flowchart with steps of a third exemplary embodiment of the method in accordance with FIG. 1.

In a step S1, in accordance with FIGS. 4 and 5, an area profile T1 with a valid identification code T2' is communicated from the central computer unit 4 via a communicative connection 41, 41' to a network address of the door fitting 1 which grants access to the secured area to which the area profile 1 relates. Step S1 can be effected as necessary, for example at regular time intervals such as weekly, monthly, etc., and/or upon a change having been made to the area profile 1 of the area secured by the door fitting 1. The communicative connection 41, 41' can be permanently maintained or it can be established only for the purposes of communicating the area profile T1.

In a step S2, in accordance with FIGS. 3 to 5, an identification code T2 of a mobile data carrier 2 is read in by a reader 10 of the door fitting 1 by data communication 21.

In a step S3, in accordance with FIG. 3, a read-in identification code T2 is communicated from the door fitting 1 via a communicative connection 41, 41' to the network address of the central computer unit 4.

In accordance with FIG. 3, the read-in identification code T2 is received by the central computer unit 4 via the communicative connection 41, 41'. In accordance with FIGS. 4 and 5, the read-in identification code T2 is present in the door fitting 1. In a step S4, in accordance with FIG. 3, the central computer unit 4 checks whether the read-in identification code T2 corresponds to a valid identification code T2' for the area secured by the door fitting 1, which valid identification code is stored in the area profile T1. If the read-in identification code T2 corresponds to the valid identification code T2', the central computer unit 4 generates an access signal T4 and communicates it via a communicative connection 41, 41' to the network address of the door fitting 1 which read in the identification code T2 and communicated it to the central computer unit 4. If the read-in identification code T2 does not correspond to the valid identification code T2', the central computer unit 4 generates a blocking signal T4' and communicates it via a communicative connection 41, 41' to the network address of the door fitting 1 which read in the identification code T2 and communicated it to the central computer unit 4.

In a step S4, in accordance with FIGS. 4 and 5, the door fitting 1 checks whether the read-in identification code T2 corresponds to a valid identification code T2' for the area secured by the door fitting 1, which valid identification code T2' is stored in the area profile T1. If the read-in identification code T2 corresponds to the valid identification code T2', the door fitting 1 generates an access signal T4. If the read-in identification code T2 does not correspond to the valid identification code T2', the door fitting 1 generates a blocking signal T4'. In accordance with FIG. 5, a read-in identification code T2 and the blocking signal T4' generated for this one read-in identification code T2 are communicated from the door fitting 1 via a communicative connection 41, 41' to the network address of the central computer unit 4.

In accordance with FIG. 5, a read-in identification code T2 and a blocking signal T4' generated for this identification code T2 are received by the central computer unit 4 via the communicative connection 41, 41'. In a step S4', in accordance with FIG. 5, the central computer unit 4 checks whether the read-in identification code T2 corresponds to a valid identification code T2' for the area secured by the door fitting 1, which valid identification code T2' is stored in the area profile T1. If the read-in identification code T2 corresponds to the valid identification code T2', the central computer unit 4 generates an access signal T4". In accordance with FIG. 5, a read-in identification code T2 and the access signal T4" generated for this read-in identification code T2 are communicated from the central computer unit 4 via a communicative connection 41, 41' to the network address of the door fitting 1 which read in the identification code T2 and communicated it to the central computer unit 4. If the read-in identification code T2 does not correspond to the valid identification code T2', the central computer unit 4 generates a blocking signal T4'''. In accordance with FIG. 5, a read-in identification code T2 and the blocking signal T4''' generated for this read-in identification code T2 are communicated from the central computer unit 4 via a communicative connection 41, 41' to the network address of the door fitting 1 which read in the identification code T2 and communicated it to the central computer unit 4.

In accordance with FIG. 3, an access signal T4 is received by the door fitting 1 via the communicative connection 41, 41'. In accordance with FIG. 4, an access signal T4 is present in the door fitting 1. In accordance with FIG. 5, a read-in identification code T2 and an access signal T4'' generated for this read-in identification code T2 are received by the door fitting 1 via the communicative connection 41, 41'. In a step S5, in accordance with FIGS. 3 to 5, the door fitting 1, for an access signal T4 present, grants access to the area secured by the door fitting 1 and/or outputs access information for example in the form of an activated luminaire and/or an activated loudspeaker of the door fitting 1.

In accordance with FIG. 3, a blocking signal T4' is received by the door fitting 1 via the communicative connection 41, 41'. In accordance with FIG. 4, a blocking signal T4' is present in the door fitting 1. In accordance with FIG. 5, a read-in identification code T2 and a blocking signal T4''' generated for this read-in identification code T2 are received by the door fitting 1 via the communicative connection 41, 41'. In a step S5', in accordance with FIGS. 3 to 5, the door fitting 1, for a blocking signal T4', T4''' present, does not grant access to the area secured by the door fitting 1 and/or outputs blocking information for example in the form of an activated luminaire and/or an activated loudspeaker of the door fitting 1.

Figure 6:
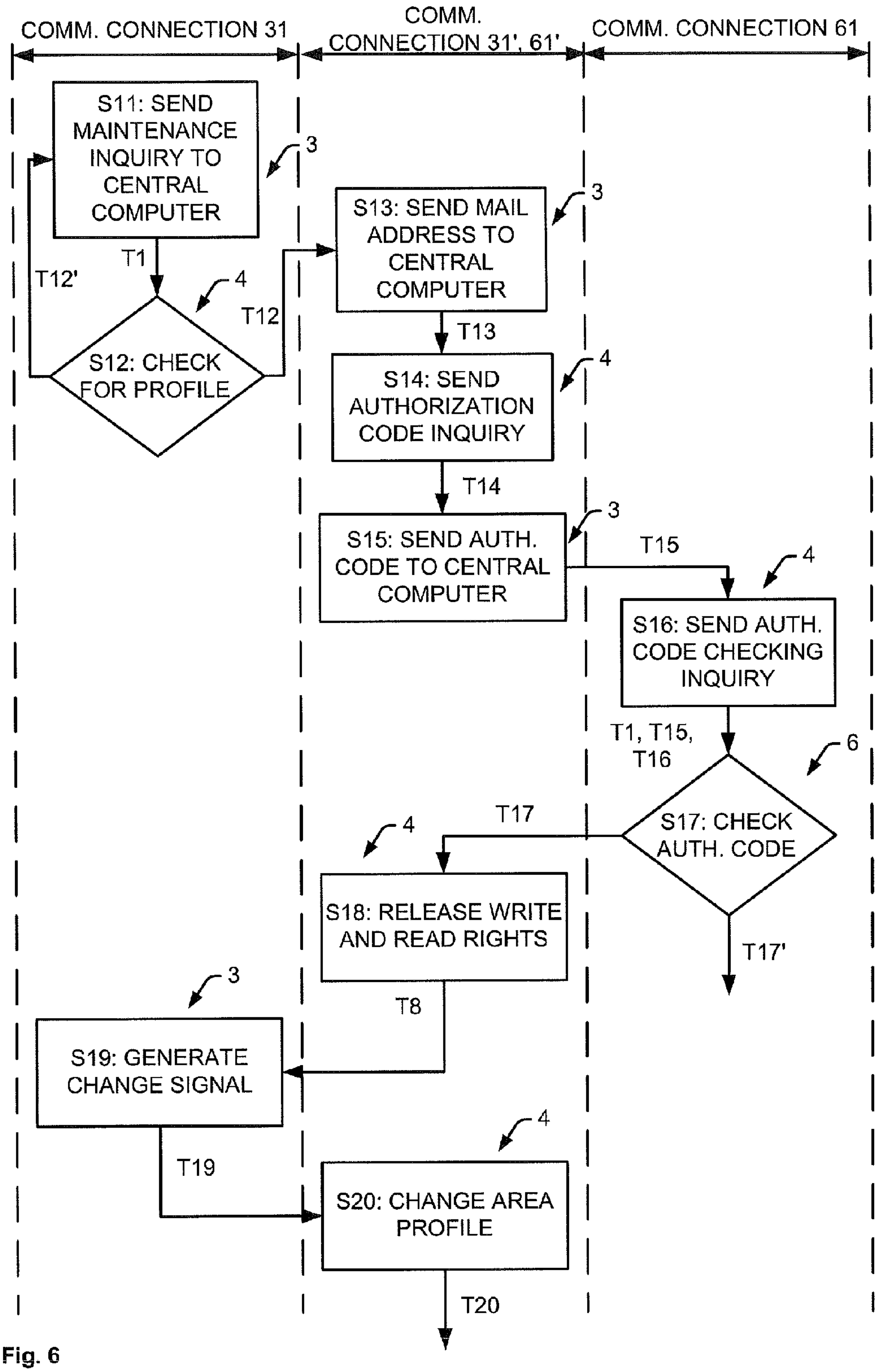
FIG. 6 shows a flowchart with steps of a fourth exemplary embodiment of the method in accordance with FIG. 1.
Figure 7:
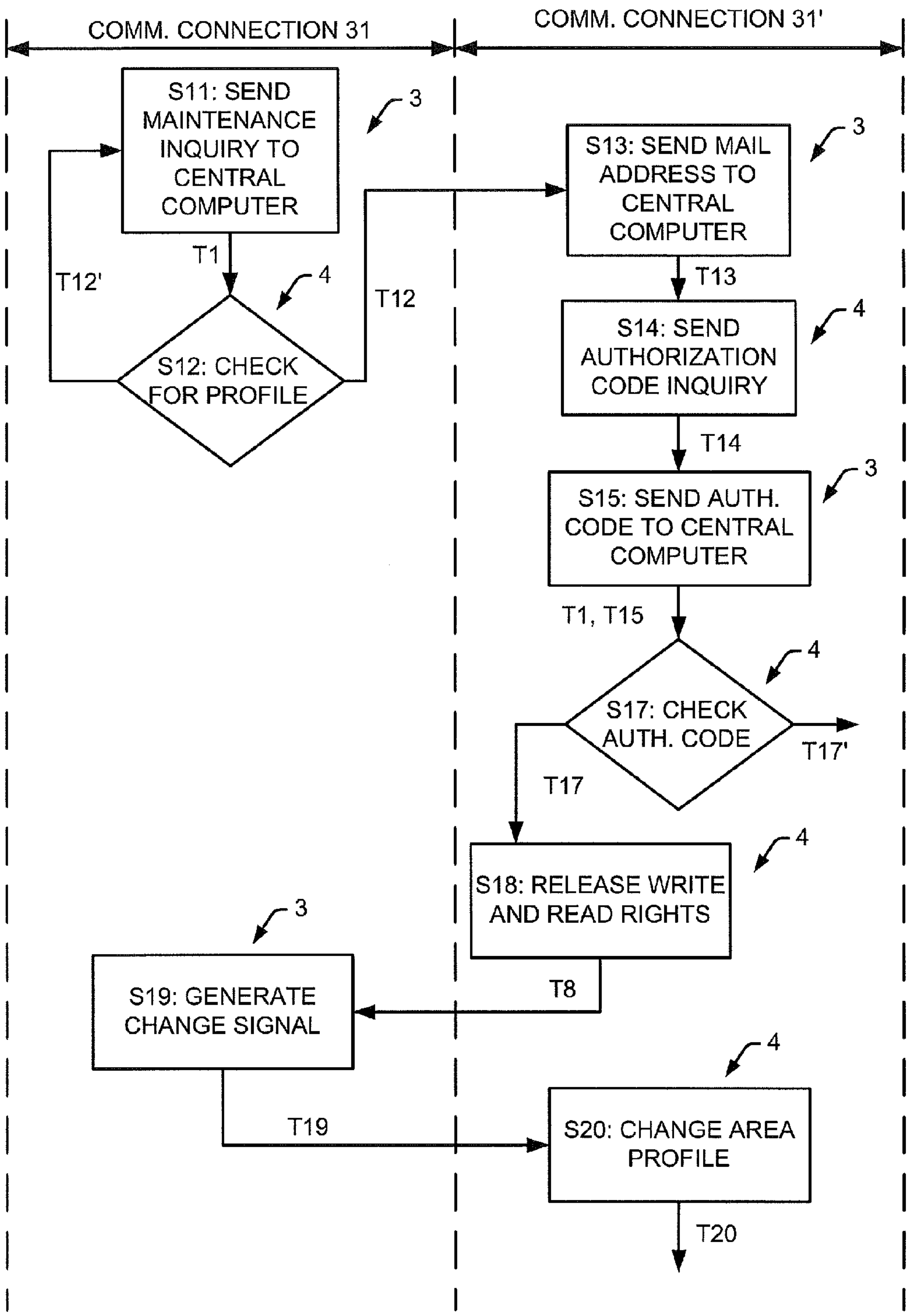
FIG. 7 shows a flowchart with steps of a fifth exemplary embodiment of the method in accordance with FIG. 1.

In a step S11, in accordance with FIGS. 6 and 7, maintenance of an area profile is initiated by virtue of the computer unit 3 communicating a maintenance enquiry of an area profile T1 to the network address of the central computer unit 4 via a communicative connection 31.

In accordance with FIGS. 6 and 7, the maintenance enquiry, the area profile T1 and the network address of the computer unit 3 are received by the central computer unit 4 via the communicative connection 31. In a step S12, in accordance with FIGS. 6 and 7, the central computer unit 4 checks whether the area profile T1 exists in the access control system. If the area profile T1 exists in the access control system, the central computer unit 4 communicates a mail address enquiry T12 to the network address of the computer unit 3 via the communicative connection 31. If the area profile T1 does not exist in the access control system, the central computer unit 4 communicates an enquiry repetition enquiry T12' to the network address of the computer unit 3 via the communicative connection 31.

In accordance with FIGS. 6 and 7, the mail address enquiry T12 is received by the computer unit 3 via the communicative connection 31. In a step S13, in accordance with FIGS. 6 and 7, the computer unit 3 communicates a mail address T13 of the computer unit 3 to the network address of the central computer unit 4 via a communicative connection 31'. The mail address T3 is communicated via an encrypted communicative connection 31', which is established via an electronic reference (hyperlink) by the computer unit 3 from the received mail address enquiry T12.

In accordance with FIGS. 6 and 7, the mail address T13 is received by the central computer unit 4 via the encrypted communicative connection 31'. In a step S14, in accordance with FIGS. 6 and 7, the central computer unit 4 communicates an authorization code enquiry T14 to the network address of the computer unit 3 via an encrypted communicative connection 31'. In addition to the authorization code enquiry T14, the central computer unit 4 can communicate a request for confirmation of the mail address T13 of the computer unit 3 to the network address of the computer unit 3.

In accordance with FIGS. 6 and 7, the authorization code enquiry T14 and, if appropriate, the request for confirmation of the mail address T13 is/are received by the computer unit 3 via the communicative connection 31'. In a step S15, in accordance with FIGS. 6 and 7, the computer unit 3 communicates an authorization code T15 and, if appropriate, a confirmation of the mail address T3 to the network address of the central computer unit 4 via an encrypted communicative connection 31'.

In accordance with FIGS. 6 and 7, the authorization code T15 and, if appropriate, the confirmation of the mail address T13 is/are received by the central computer unit 4 via the encrypted communicative connection 31'. In a step S16, in accordance with FIG. 6, the central computer unit 4 communicates an authorization code checking enquiry T16 with the authorization code T15 and the area profile T1 to a mail address of the building computer unit 6 via a communicative connection 61.

In accordance with FIG. 6, the authorization code checking enquiry T16, the authorization code T15 and the area profile T1 are received by the building computer unit 6 via the communicative connection 61. In a step S17, in accordance with FIG. 6, the building computer unit 6 checks whether the authorization code T15 is valid for the area profile T1. If the authorization code T15 is valid for the area profile T1, in accordance with FIG. 6, the building computer unit 6 generates an authorization signal T17 and communicates it to the network address of the central computer unit 4 via an encrypted communicative connection 61'. If the authorization code T15 is invalid for the area profile T1, in accordance with FIG. 6, the building computer unit 6 generates a non-authorization signal T17' and communicates it to the network address of the central computer unit 4 via the encrypted communicative connection 61'. The communication of the authorization signal T17 or of the non-authorization signal T17' is effected via an encrypted communicative connection 61' established via an electronic reference (hyperlink) by the building computer unit 6 from the received authorization code checking enquiry T16.

In accordance with FIG. 7, the authorization code checking enquiry T16, the authorization code T15 and the area profile T1 are present in the central computer unit 4. In a step S17, in accordance with FIG. 7, the central computer unit 4 checks whether the authorization code T15 is valid for the area profile T1. If the authorization code T15 is valid for the area profile T1, in accordance with FIG. 7, the central computer unit 4 generates an authorization signal T17. If the authorization code T15 is invalid for the area profile T1, in accordance with FIG. 7, the central computer unit 4 generates a non-authorization signal T17'.

In accordance with FIG. 6, the authorization signal T17 or the non-authorization signal T17' is received by the central computer unit 4 via the encrypted communicative connection 61'. In accordance with FIG. 7, an authorization signal T17 or a non-authorization signal T17' is present in the central computer unit 4. In a step S18, in accordance with FIGS. 6 and 7, the central computer unit 4, for an authorization signal T17 present, releases write and read rights for the area profile T1. It generates a release signal T18 and communicates the release signal T18 to the mail address of the computer unit 3 via a communicative connection 31.

In accordance with FIGS. 6 and 7, the release signal T18 is received by the computer unit 3 via the communicative connection 31. In a step S19, in accordance with FIGS. 6 to 8, the computer unit 3 generates a change signal T19 and communicates it to the network address of the central computer unit 4 via a communicative connection 31'. The change signal T19 is communicated via an encrypted communicative connection 31' established via an electronic reference (hyperlink) by the computer unit 3 from the received release signal T18.

Figure 8:
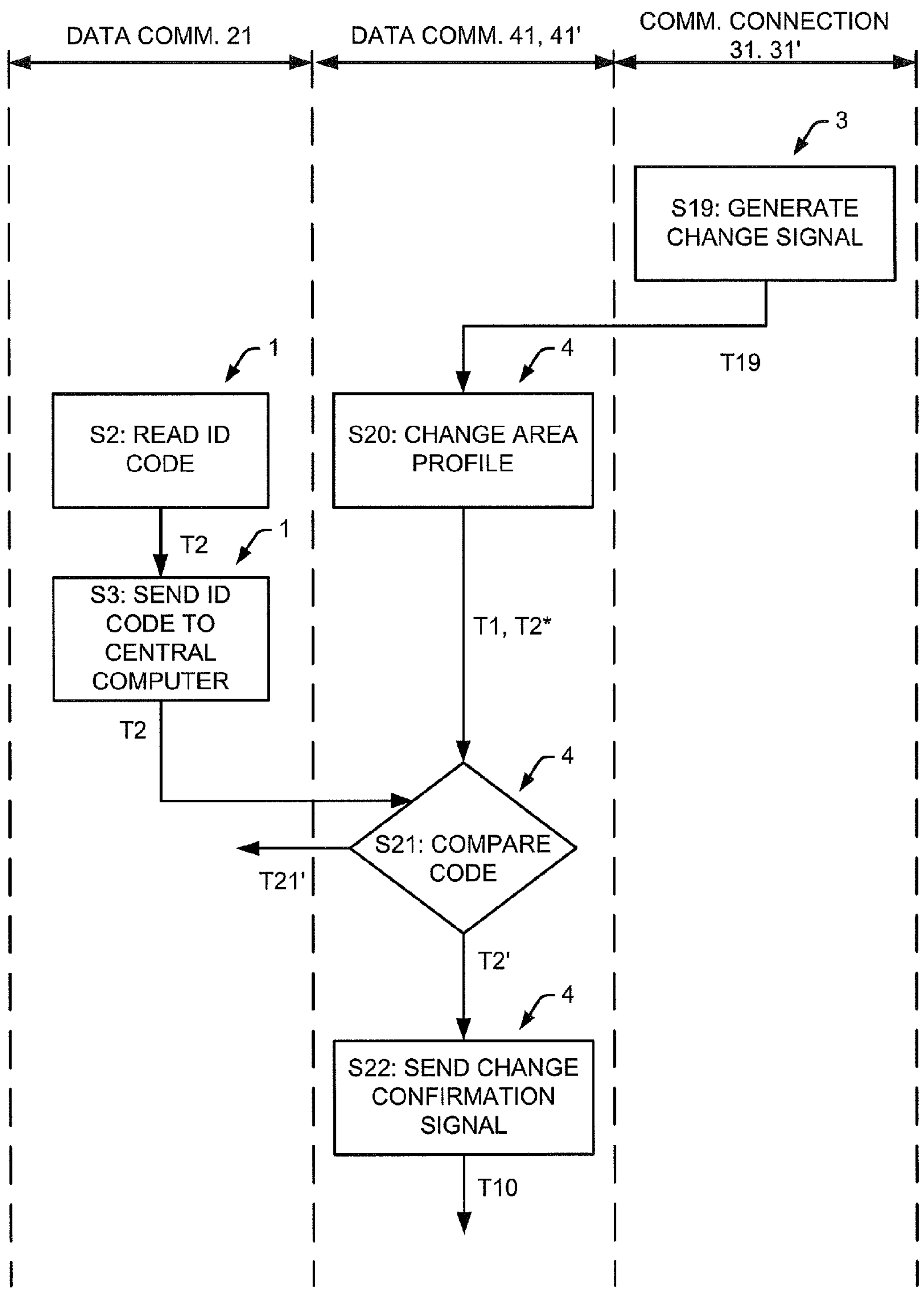
FIG. 8 shows a flowchart with steps of a sixth exemplary embodiment of the method in accordance with FIG. 1.

In accordance with FIGS. 6 to 8, the change signal T19 is received by the central computer unit 4 via the encrypted communicative connection 31'. In a step S20, in accordance with FIGS. 6 and 7, the central computer unit 4, for a received change signal T19, implements changes in the area profile T1 and communicates a change confirmation signal T20 to the network address of the computer unit 3 via an encrypted communicative connection 31'.

Given knowledge of the present disclosure, the person skilled in the art can also realize the encrypted communicative connection 31', 61' described above by an unencrypted communicative connection 31, 61.

In a step S20, in accordance with FIG. 8, the central computer unit 4 implements a change signal T19 in a change in a released area profile T1 in such a way that a provisional identification code T2* is created therein.

In a step S21, in accordance with FIG. 8, a read-in identification code T2 is compared with the provisional identification code T2* created. If the read-in identification code T2 was read in at the door fitting 1 which grants access to the secured area of the released area profile T1 with the provisional identification code T2* created, and the read-in identification code T2 corresponds to said provisional identification code T2*, the read-in identification code T2 is included in the released area profile as valid identification code T2'. If that is not the case, and the read-in identification code T2 deviates from the provisional identification code T2" created, the central computer unit 4 generates an error signal T21.

In a step S22, in accordance with FIG. 8, the central computer unit 4, for the identification code T2' included as valid in the area profile T1, communicates a change confirmation signal T20 to the network address of the computer unit 3 via a communicative connection 31, 31'.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. We therefore claim as our invention all that comes within the scope and spirit of these claims.

We claim:

1. An access control system method, the method comprising:

receiving, using a central computer, an authorization code sent from a computer;

determining whether the authorization code corresponds to a valid authorization code for an area profile comprising information to grant access to an area;

generating a provisional identification code when the authorization code is determined to correspond to the valid authorization code, the provisional identification code being based on an identification code of a mobile data carrier and used to add an entity associated with the mobile data carrier to the area profile to access the area;

storing, in the area profile, the provisional identification code;

reading, using a reader of a door fitting, the identification code from the mobile data carrier, the door fitting controlling access to the area;

determining that the identification code from the mobile data carrier corresponds to the provisional identification code; and as a result of the determining that the identification code from the mobile data carrier corresponds to the provisional identification code, storing the identification code read from the mobile data carrier in the area profile as a valid identification code so that a user of the mobile data carrier can be provided access to the area.

2. The method of claim 1, further comprising changing a validity of an identification code of the area profile.

3. The method of claim 1, the provisional identification code comprising a digit sequence.

4. The method of claim 1, the provisional identification code being further based on a time duration specified in the area profile.

5. The method of claim 1, further comprising comparing, using the door fitting, a further identification code to the valid identification code.

6. The method of claim 1, further comprising comparing, using the central computer, a further identification code to the valid identification code.

7. The method of claim 1, the determining that the authorization code corresponds to the valid authorization code for the area profile comprising:

sending the authorization code to a building control unit; and receiving an authorization signal from the building control unit, the authorization signal indicating that the building control unit found the authorization code to correspond to the valid authorization code for the area profile.

8. The method of claim 1, wherein the area profile is further changeable in response to an authorized change signal obtained from a remote computing unit.

9. An access control system, comprising:

a central computer, the central computer being programmed to, receive an authorization code sent from a computer to change an area profile, the area profile comprising information to grant access to an area, determine whether the authorization code corresponds to a valid authorization code for the area profile, generate a provisional identification code when the authorization code is determined to correspond to the valid authorization code, the provisional identification code being based on an identification code of a mobile data carrier and used to add an entity associated with the mobile data carrier to the area profile, and store, in the area profile, the provisional identification code; and a door fitting, the door fitting comprising a reader, the door fitting controlling access to the area, the door fitting being programmed to, read the identification code from the mobile data carrier, determine that the identification code from the mobile data carrier corresponds to the provisional identification code, and as a result of determining that the identification code from the mobile data carrier corresponds to the provisional identification code, store the identification code read from the mobile data carrier in the area profile as a valid identification code.

10. The access control system of claim 9, further comprising a computer-readable data memory storing the area profile, the computer-readable data memory being part of the central computer.

11. The access control system of claim 9, further comprising a computer-readable data memory storing the area profile, the computer-readable data memory being part of the door fitting.

12. The access control system of claim 9, the computer being located in the area whose access is controlled by the door fitting.

13. A computer-readable data memory having encoded thereon instructions that, when executed by a door fitting, cause the door fitting to perform a method, the door fitting controlling access to an area, the method comprising:

reading an identification code from a mobile data carrier;

reading a provisional identification code from an area profile, the area profile comprising information to grant access to an area, the provisional identification code being based on the identification code from the mobile data carrier and used to add an entity associated with the mobile data carrier to the area profile;

comparing the identification code with the provisional identification code;

determining whether the identification code read by the door fitting corresponds to the provisional identification code; and as a result determining that the identification code from the mobile data carrier corresponds to the provisional identification code, storing the identification code read from the mobile data carrier in the area profile as a valid identification code.

14. The computer-readable data memory of claim 13, the method further comprising granting access to the area.

15. A computer-readable data memory having encoded thereon instructions that, when executed by a computer, cause the computer to perform a method, the method comprising:

receiving an authorization code sent from another computer to change an area profile, the area profile comprising information to grant access;

determining whether the authorization code corresponds to a valid authorization code for the area profile, the area profile being associated with an area to which the access is controlled by a door fitting; and generating a provisional identification code when the authorization code is determined to correspond to the valid authorization code, the provisional identification code being based on an identification code of a mobile data carrier and used to add an entity associated with the mobile data carrier to the area profile; and storing, in the area profile, the provisional identification code.

16. The computer-readable data memory of claim 15, the area profile being stored in a data memory in the door fitting.

17. A door fitting, comprising:

a processor;

a reader; and a memory, the memory having encoded thereon instructions that, when executed by the processor, cause the door fitting to perform a method, the method comprising, reading an identification code from a mobile data carrier using the reader, reading a provisional identification code from an area profile, the area profile comprising information to grant access to an area related to the door fitting, the provisional identification code being based on the identification code from the mobile data carrier and used to add an entity associated with the mobile data carrier to the area profile, comparing the identification code with the provisional identification code, determining whether the identification code read from the mobile data carrier by the door fitting corresponds to the provisional identification code, and as a result of the determining, storing the identification code read from the mobile data carrier by the door fitting in the area profile as a valid identification code.

18. The door fitting of claim 17, further comprising a transmitting and receiving unit coupled to the processor.

19. The door fitting of claim 17, the method further comprising receiving the area profile from a central computer.

20. The door fitting of claim 17, the door fitting being incorporated into a door leaf of a door securing an area.

* * * * *